(12) United States Patent
Mirhaji et al.

(10) Patent No.: US 11,836,193 B2
(45) Date of Patent: Dec. 5, 2023

(54) PERSISTANCE AND LINKING OF ANALYTIC PRODUCTS IN BIG DATA ENVIRONMENTS

(71) Applicants: Albert Einstein College of Medicine, Bronx, NY (US); Franz, Inc., Oakland, CA (US)

(72) Inventors: Parsa Mirhaji, Scarsdale, NY (US); Jannes Aasman, Moraga Town, CA (US)

(73) Assignee: Albert Einstein College of Medicine, Bronx, NY (US)

( * ) Notice: Subject to any disclaimer, the term of this patent is extended or adjusted under 35 U.S.C. 154(b) by 1125 days.

(21) Appl. No.: 16/318,066

(22) PCT Filed: Jul. 14, 2017

(86) PCT No.: PCT/US2017/042182
§ 371 (c)(1),
(2) Date: Jan. 15, 2019

(87) PCT Pub. No.: WO2018/013954
PCT Pub. Date: Jan. 18, 2018

(65) Prior Publication Data
US 2021/0294861 A1    Sep. 23, 2021

Related U.S. Application Data

(60) Provisional application No. 62/362,989, filed on Jul. 15, 2016.

(51) Int. Cl.
*G06F 16/93* (2019.01)
*G06F 16/36* (2019.01)
*G06F 16/901* (2019.01)

(52) U.S. Cl.
CPC ............. *G06F 16/94* (2019.01); *G06F 16/36* (2019.01); *G06F 16/9024* (2019.01); *G06F 2216/11* (2013.01)

(58) Field of Classification Search
CPC ...... G06F 16/94; G06F 16/36; G06F 16/9024; G06F 16/9027
See application file for complete search history.

(56) References Cited

U.S. PATENT DOCUMENTS

| | | | | |
|---|---|---|---|---|
| 10,504,147 | B1 * | 12/2019 | Johnson | G06Q 30/0257 |
| 2006/0129418 | A1 * | 6/2006 | Lee | G06Q 10/06 704/9 |

(Continued)

OTHER PUBLICATIONS

International Search Report and Written Opinion for International Application No. PCT/US17/42182 dated Sep. 26, 2017.

(Continued)

*Primary Examiner* — Vaishali Shah
(74) *Attorney, Agent, or Firm* — Erik A. Huestis; Sameer K. Pai; Foley Hoag LLP

(57) ABSTRACT

Persistence and linking of analytic products is provided. Information regarding a plurality of analytic methods is collected. A first process node is generated in a network. The first process node corresponds to a first analytic method. Information is collected regarding a plurality of executions of the first analytic method. A plurality of session nodes is generated in the network corresponding to the plurality of executions. Each of the plurality of session nodes is linked to the first process node. Metadata regarding the plurality of executions is associated with the plurality of session nodes. At least one product node is generated corresponding to a product. The product integrates a result value of at least one of the plurality of executions. The at least one product node is linked to the session node of the plurality of session nodes (Continued)

corresponding to the at least one of the plurality of executions.

27 Claims, 15 Drawing Sheets

(56) References Cited

U.S. PATENT DOCUMENTS

| | | | | |
|---|---|---|---|---|
| 2007/0143322 | A1* | 6/2007 | Kothari | G06F 40/194 |
| 2012/0066166 | A1* | 3/2012 | Curbera | G06N 7/005 |
| | | | | 706/52 |
| 2013/0073970 | A1* | 3/2013 | Piantino | G06Q 50/01 |
| | | | | 715/738 |
| 2014/0188862 | A1* | 7/2014 | Campbell | G06F 16/24575 |
| | | | | 707/728 |
| 2015/0135261 | A1 | 5/2015 | Park et al. | |
| 2015/0169758 | A1 | 6/2015 | Assom et al. | |
| 2016/0086110 | A1* | 3/2016 | Ho | G06Q 10/0633 |
| | | | | 705/7.27 |
| 2016/0203237 | A1 | 7/2016 | Whitnah et al. | |

OTHER PUBLICATIONS

Belleau et al., "Bio2RDF: Towards a mashup to build bioinformatics knowledge systems," Journal of Biomedical Informatics, 41:706-716 (2008).

Extended European Search Report for EP Application No. EP 17828551 dated Jan. 2, 2020.

International Preliminary Report on Patentability for International Application No. PCT/US2017/042182 dated Jan. 15, 2019.

Terkaj et al., "Ontology-based Modeling of Production Systems for Design and Performance Evaluation," IEEE, 748-753 (2014).

\* cited by examiner

PERSISTANCE AND LINKING OF ANALYTIC PRODUCTS IN BIG DATA ENVIRONMENTS

CROSS-REFERENCE TO RELATED APPLICATIONS

This application is a U.S. National Stage of International Patent Application No. PCT/US17/42182, filed Jul. 14, 2017, which claims the benefit of U.S. Provisional Application No. 62/362,989, filed Jul. 15, 2016, which are hereby incorporated by reference in their entirety.

BACKGROUND

Embodiments of the present invention relate to persistence and linking of analytic products, and more specifically, to methods, systems, and data structures for networks of analytics methods and their various products.

BRIEF SUMMARY

According to one embodiment of the present invention, a method of, system for, and computer program product for persistence and linking of analytic products are provided. Information regarding a plurality of analytic methods is collected. A first process node is generated in a network. The first process node corresponds to a first analytic method. Information is collected regarding a plurality of executions of the first analytic method. A plurality of session nodes is generated in the network corresponding to the plurality of executions. Each of the plurality of session nodes is linked to the first process node. Metadata regarding the plurality of executions is associated with the plurality of session nodes. At least one product node is generated corresponding to a product. The product integrates a result value of at least one of the plurality of executions. The at least one product node is linked to the session node of the plurality of session nodes corresponding to the at least one of the plurality of executions.

In some embodiments, the product is a journal publication, a report, a presentation, or a patent publication. In some embodiments, the at least one product node comprises a URI referencing the corresponding product. In some embodiments, the product is a datastore.

In some embodiments, a register node is generated corresponding to the result value. The register node is linked to the session node of the plurality of session nodes corresponding to the at least one of the plurality of executions. In some such embodiments, a plurality of data nodes is generated. The data nodes correspond to data, the data having been input to the at least one of the plurality of executions. The plurality of data nodes is linked to the register node.

In some embodiments, the network is traversed to determine a set of products derived from the first analytic method.

In some embodiments, a remote request is received from a user. The user is associated with at least one of the plurality of data nodes. The network is traversed to determine a set of products derived from data of the at least one of the plurality of data nodes.

In some embodiments, the network is represented as a graph. In some such embodiments, the network is traversed to determine a set of products derived from the data.

In some embodiments, the network further comprises an authentication node linked to at least one of the plurality of data nodes. A request for access to the at least one of the plurality of data nodes is validated based on the authentication node.

In some embodiments, the product is a datastore, and the datastore is referenced by a data node of the plurality of data nodes.

DETAILED DESCRIPTION

Figure 1:
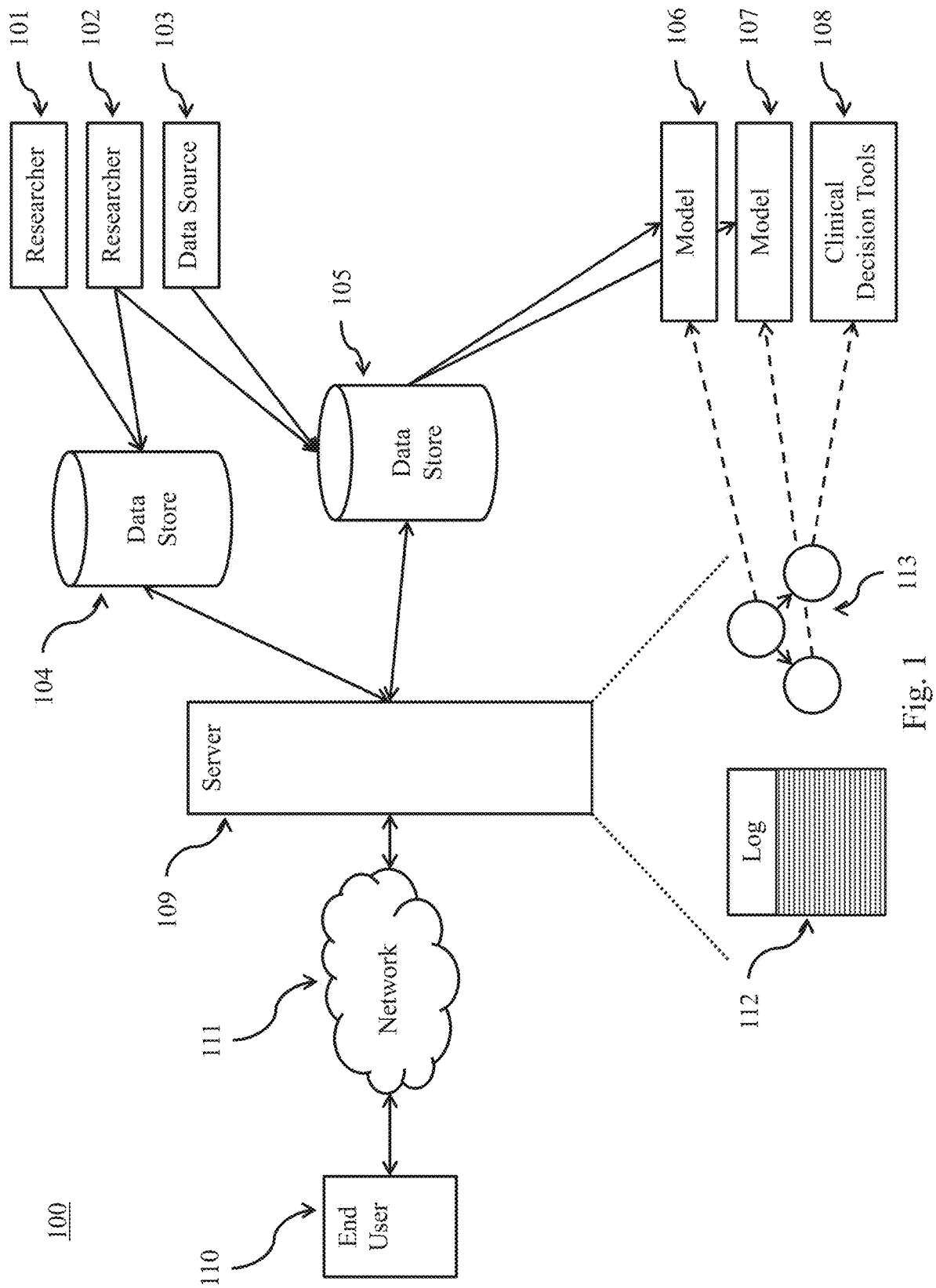
FIG. 1 illustrates an exemplary system according to embodiments of the present disclosure.

As computing power and storage have reduced in cost, and as cloud solutions have proliferated, complex analytic techniques have become readily available. The impact has been particularly striking in the healthcare sector, where big data analytics have allowed unprecedented quantitative analysis and predictive modeling.

However, the results of analytic interrogation of data are often persisted in formats that are not directly linkable to the underlying data used to generate those results. This disconnect limits the potential utility of big data environments in which many algorithms and methods are applied to data by users from multiple different disciplines and backgrounds. In particular, this disconnect results in loss of information. Important value added analytic understanding of the data may become lost in the data clutter, forgotten, or disconnected from a network and thereby no longer physically accessible. Reproducibility may become compromised as well, due to imperfect preservation of analytic methods. Contradictory or significantly different conclusions are common phenomena in these situations, which result in loss of productivity due to expensive validation efforts. It is resource intensive to determine the root cause of discrepancies between conclusions made by different methods or by the same method longitudinally or over time. This is particularly the case where important assumptions and contextual information are not captured and linked to the underlying data.

Inadequate analytical methods that produce unreliable conclusions often leave no trace behind for a secondary reviewer to determine the appropriateness of the method to the conclusions provided. This leads to significant additional costs for accountability and compliance. For example, a secondary reviewer may not know if a critical variable (e.g., use of Aspirin or history of mental illness) were omitted from a model that intends to predict probability of readmission due to heart failure. Accountability and compliance to industry standards are necessary to protect institutions and investments. Standards compliance cannot necessarily be ascertained or enforced proactively and consistently using conventional methods before a liability/quality issue emerges.

Inadequate coordination methods may result in duplicative work. Several groups may perform similar analytics independently due to lack of knowledge about other work in the field. This may result in unmanageable variability and loss of time, resources, or productivity. Similarly, value-added higher-level analytics could be modeled based on lower level analytic results if they were seamlessly available for automated interrogation. For example, a preventable readmission model could be improved if it could automatically find the output from a risk assessment algorithm that predicts probability of mental problems in a specific cohort of patients that are common between the two models. Opportunities for meta-analysis and continuous learning from aggregates of analytic information and aggregates of raw data are endless.

In light of the above, it will be apparent that there is a need in the art for frameworks and methods for persistence and linking of analytic products in big data environments.

Embodiments of the present disclosure include frameworks and methods that explicitly link data to its analytic derivatives, to all contextual information (metadata) necessary to computationally understand the derivatives, and to all downstream intellectual and digital products associated with the data and with the analytics (e.g., publications, reports, devices, patents, etc.).

With reference now to FIG. 1, an exemplary system according to embodiments of the present disclosure is illustrated. In system 100, multiple researchers 101 . . . 102 and other data sources 103 provide medical data to data stores 104 . . . 105. Various models 106 . . . 107 or clinical decision tools 108 draw data from data stores 104 . . . 105 in order to provide clinical decision support or model a condition. In some embodiments, a physician interacts with a clinical decision tool 108 in the course of treatment. In some embodiment, models 106 . . . 107 or clinical decision tools 108 provide results back to data stores 104 . . . 105 for later validation.

In some embodiments, server 109 accesses data stores 104 . . . 105. In some embodiments, end user 110 accesses server 109 via network 111, which may be the internet. In some embodiments, the end user is a patient. Access may be available through a web interface, and may provide both access to clinical data and to information regarding the subsequent use of clinical data as set forth further below.

In some embodiments, server 109 includes log 112. Log 112 records each use by models 106 . . . 107 or clinical decision tools 108 of data from data stores 104 . . . 105. In some embodiments, server 109 includes graph 113. As set forth in greater detail below, graph 113 tracks dependency between various models 106 . . . 107 and clinical decision tools 108.

It will be appreciated that server 109, each data store 104 . . . 105, the end user interface 110, and the various models 106 . . . 108 may be hosted by a computing node or cluster of computing nodes as described further below. In some embodiments, data store 104 . . . 105 comprise a NoSQL data store or a distributed filesystem such as RDFS.

Frameworks according to the present disclosure include a network or graph of interconnected objects. This graph network includes information on various data producers and consumers in an analytics setting such as the medical analytics setting. These include the derivatives (e.g., aggregates, computations, intermediate and final outputs) produced by disparate and heterogeneous sets of interpretative functions, over time (longitudinally); Models formally describing the derivatives in the network with associated metadata; Data points, datasets, and databases participating in producing the derivatives; Models formally describing data participating in producing the derivatives; Downstream artifacts, physical or virtual associated with the derivatives, either individually or in aggregate (e.g., papers published, reports distributed, announcements made).

Figure 2:
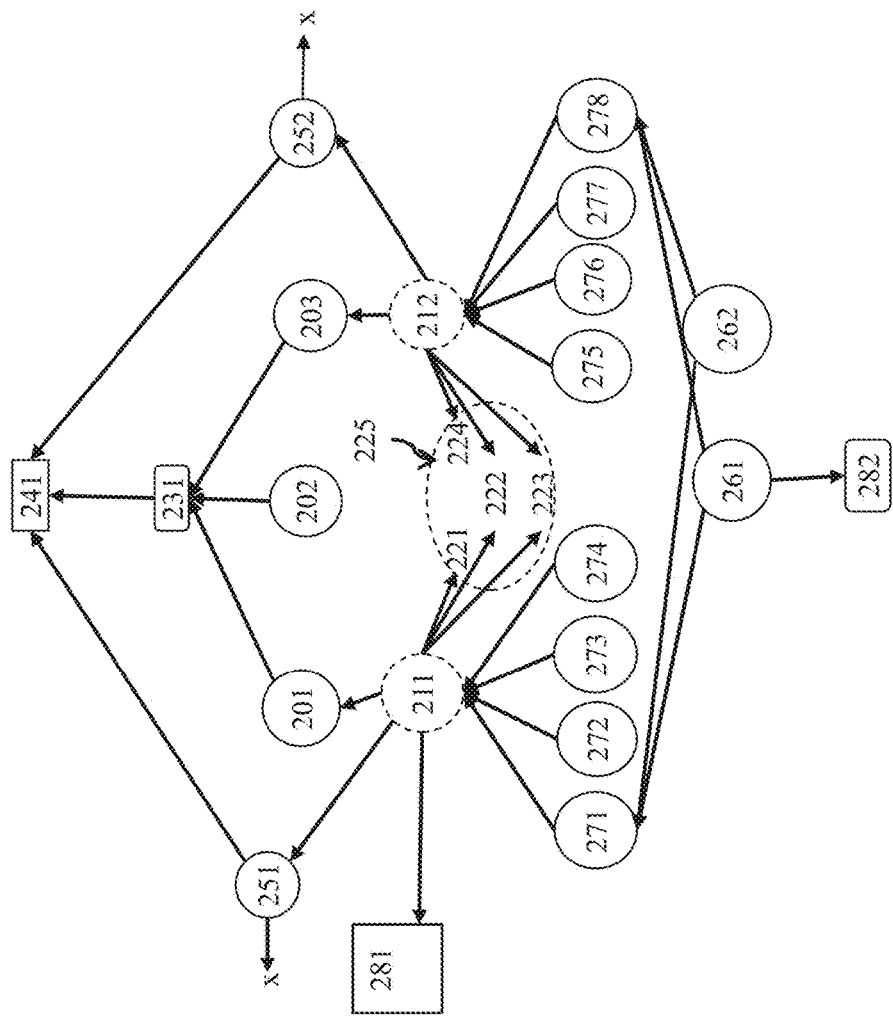
FIG. 2 illustrates an exemplary data network according to embodiments of the present disclosure.

Referring now to FIG. 2, an exemplary data network according to embodiments of the present disclosure is illustrated. Although it will be appreciated that alternative data structures are suitable for use in accordance with the present disclosure, this exemplary embodiment is presented as a graph comprising a plurality of nodes connected by edges. In some embodiments, such a graph is represented using the W3C Resource Description Framework (RDF), which uses unique resource identifiers (URIs) to represent both nodes and properties as triples or {Subject, Property, Object} statements. However, other embodiments use other data representations such as relational schema, object oriented models, xml, or key-value JSON implementations.

Referring to exemplary network 200, node 201 is created to uniquely represent an analytic method, algorithm, query, or process that is going to be used for interpretation of data. In general, such a node may be referred to as a process node. A distinct URI is used to globally reference the analytic process, query, or method used. This URI is also used to capture all metadata about the analytic method, for example an executable application that implements it (e.g., in SAS, R, MLLib, or a custom javascript). A more complex procedure or model is represented as a node (URI) that is connected by edges to multiple nodes to represent subroutines called by the main function to compose the complex behavior. Thus, although the present example focuses on the main function represented by node 201, in other exemplary configurations, multiple nodes describe the behavior of node 201. Human readable notes, definitions, descriptions and annotations describing the details of the analytic method are also linked with this node.

A new node 211 is created to represent an instance of node 201 that is currently being executed in a specific analytic session. In general, such a node may be referred to as a session node. A session node is in turn linked to other nodes. First, the session node is linked to the analytic method, algorithm, query or process that it belongs to. In addition, the session node is linked to metadata, e.g., time stamps reflecting the session execution time 221, and start 222 and end 223 dates for the data incorporated in the relevant analysis. In some embodiments, this metadata is included in one or more temporal node 225, while in some embodiments the timestamps are directly referenced by a session node. It will be appreciated that additional temporal data regarding the underlying data may be included in temporal node 225, or some of the exemplary fields described herein may be omitted. Sessions provide a central representation of actual analysis events, and accumulate links and metadata.

As shown, session node 211 is connected to process node 201 by an edge. The edge represents that an analytic session has occurred at time 221, which includes data from date 222 to 223 using the analytic algorithm or method of process node 201. A session definition is the representation of the fact that data from an analytic method signified by node 201 is present and available, was produced at time 221, and that the underlying data extends between date 222 and 223. Additional session nodes (not shown in FIG. 2) may be provided to represent additional executions of the analytic method, algorithm, query or process. Each of the additional session nodes may be linked to its respective process node. As set forth below, in some embodiments, the actual results are not included in session node 211, but instead are linked through additional nodes in the network.

In some embodiments, an ontology of analytic configurations is provided in which classes of analytic methods and their relevant parameters are uniquely represented as nodes. In such an ontology, a class of analytics (e.g., a Body Mass Index calculation) and all of the parameters that are relevant to it are reflected as nodes. With reference to the network of FIG. 2, class node 231 is linked to parameter 241.

An edge connects node 201 to class node 231. By virtue of this edge, the network reflects that node 201 represents an individual implementation of the class of methods represented by class node 231. In this exemplary network, additional process nodes 202, 203 represent additional implementations of the class of BMI calculations represented by class node 231. It will be apparent that the methods underlying process nodes 201 . . . 203 may be implanted in different languages, for example, R, SAS, or Java. Each such method may in this example compute BMI, but with different assumptions on input or output format.

For every parameter as defined in the ontology (e.g., parameter node 241) a value node 251 is linked to an instance node 211 and to the parameter node parameter. Value node 251 captures the value assumed by the instance of instance node 211 for the parameter corresponding to parameter node 241. In this manner, configuration values for each session are captured.

With reference to FIG. 2, it will be apparent that additional analytic events, e.g., instance or session node 212, corresponding to additional process nodes, e.g., node 203, may be included in the same network and may refer to the same class node 231. Using the network of the present disclosure, two events may be differentiated by metadata that characterize such events, including the temporal aspects of the execution of the algorithm, the scope of longitudinal data included in each session, and the configuration parameters used to setup the process for each session. An agent can traverse the network to identify sessions that incorporate analytic results from execution of a given class of analytics at a given time, for a given extent of data. Such an agent can distinguish between the methods used (as reflected in process nodes 201 . . . 203) and the individual sessions (as reflected in session nodes 211 . . . 212). It will be apparent to such an agent that the data from multiple sessions should coincide where they used similar configurations (as reflected in value nodes 251 . . . 252).

For every data point in a given dataset a node 261 . . . 262 is provided that uniquely represents the data point. For example, a data point representing a body weight of 150 pounds might be expressed through data node 261 while a height of 68 inches might be expressed through data node 262. Data nodes 261 . . . 262 reflect data for a given subject at the time collected. The data nodes represent data points that may serve as input to executions of the analytic method represented by the session node.

For every unique result or derivative produced by any analytic method (e.g., that of process node 201) a register node 271 . . . 278 is created to represent it. For example, where a body weight of 150 pounds is expressed through data node 261 and a height of 68 inches is expressed through data node 262, the calculated value of BMI is expressed through linked register node 271. By linking back through instance node 211 and process node 201, all other metadata produced by the algorithm of node 201 may be determined by traversing the graph (e.g., degrees of freedom, confidence intervals, mean errors, precisions, rounding information). For example, traversing the graph allows the determination that the value for register node 271 (BMI in this example) was valid at time 221 when the instance of node 211 executed the algorithm of node 201.

As can be seen in the exemplary graph of FIG. 2, an edge extends between data nodes 261 . . . 262 and register node 271. In other exemplary graphs, additional edges extend from register nodes 272 . . . 278 to additional data nodes corresponding to additional data collected for additional patients.

Links from register nodes 271 . . . 274 to instance node 211 reflect that register nodes 271 . . . 274 represent derivatives produced by the algorithm of node 201 at time 221, based on a date range from date 222 to date 223. Using the above linkage between sessions (session nodes 211 . . . 212) and their derivatives (register nodes 271, 278) using different implementations (201, 203) of the same class of algorithms (class node 231) on the same data points (data nodes 261, 262), but at different times (times 221, 224), these results can be compared. For example, if register nodes 271, 278 reflect small variations in computed value, further analysis of the underlying algorithms may be indicated.

Networks according to the present disclosure are extensible on an ad-hoc basis by linking additional classes of concepts or nodes from another ontology. Through additional linking, further context, classification, or characterization may be provided for the nodes in the graph. For example, the networks of the present disclosure provide for linkage to downstream byproducts. In some embodiments, linking to access control information is provided to allow authorization for access or use of derivative results.

In some embodiments, product nodes are generated from downstream products such as publications, reports, presentations, patent publications, or devices that integrate a derivative or result value of a session. Links are provided from the or session node to the respective product node. In this way, an agent can navigate from a dataset or derivatives of a dataset to identify all products of that dataset or vice versa by traversing a graph. For example, publication node 281 represents a publication that contains the results from the session of node 211.

In some embodiments, a granular authorization and access control scheme is provided. For example, authorization node 282 corresponds to an authorization framework that is applicable to data node 261 and thereby to any derivatives. In some embodiments, the authorization node 282 includes a URI to an appropriate authentication provider.

Figure 3:
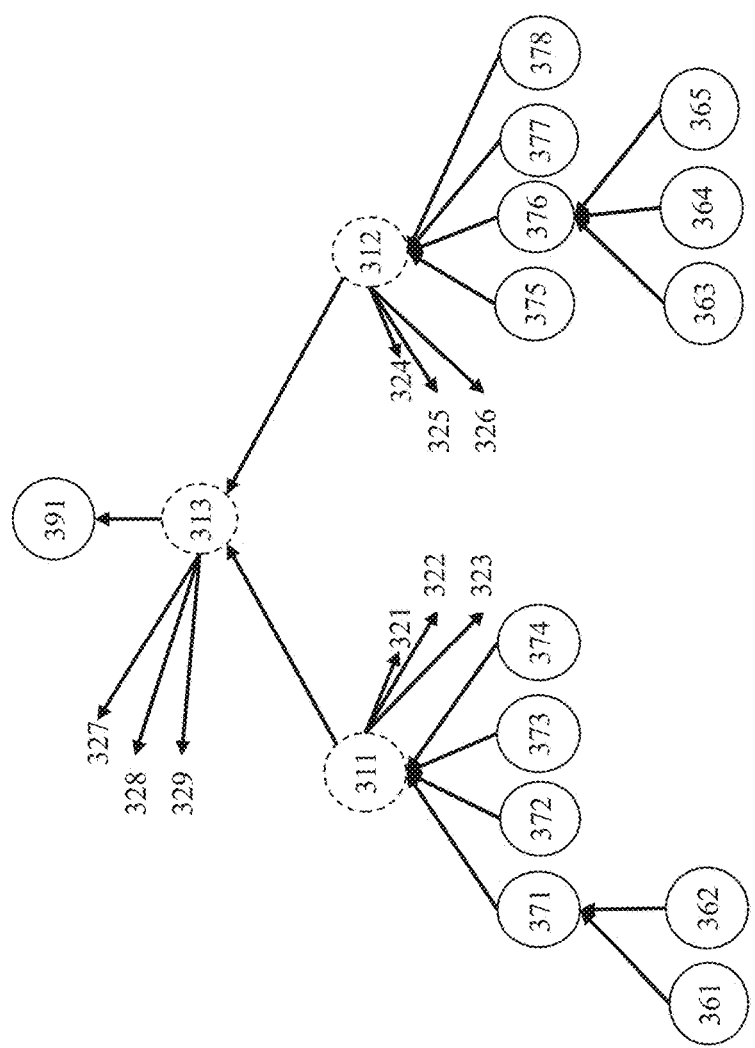
FIG. 3 illustrates an exemplary data network according to embodiments of the present disclosure.

Referring now to FIG. 3, a post-hoc meta-analysis across multiple analytic products and their underlying data is illustrated. In this example, a node 391 corresponding to a higher level analytic processes is created. Session node 313 corresponding to this process is created to present its execution. As with the session nodes discussed above, node 313 is connected to metadata indicating that it ran at time 327 based on a date range from date 328 to date 329. Session node 313 in in turn linked to additional session nodes 311 . . . 312, which represent other sessions under analysis. Each session node 311 . . . 312 is linked to time and date information 321 . . . 324, as well as register nodes 371 . . . 378 and in turn to data nodes 361 . . . 365. This provides the necessary data and metadata for the analysis corresponding to node 391. Such analysis may be performed after the completion of the analyses of nodes 311 . . . 312, through the completion of the session node 313, at timestamp node 327.

Figure 4:
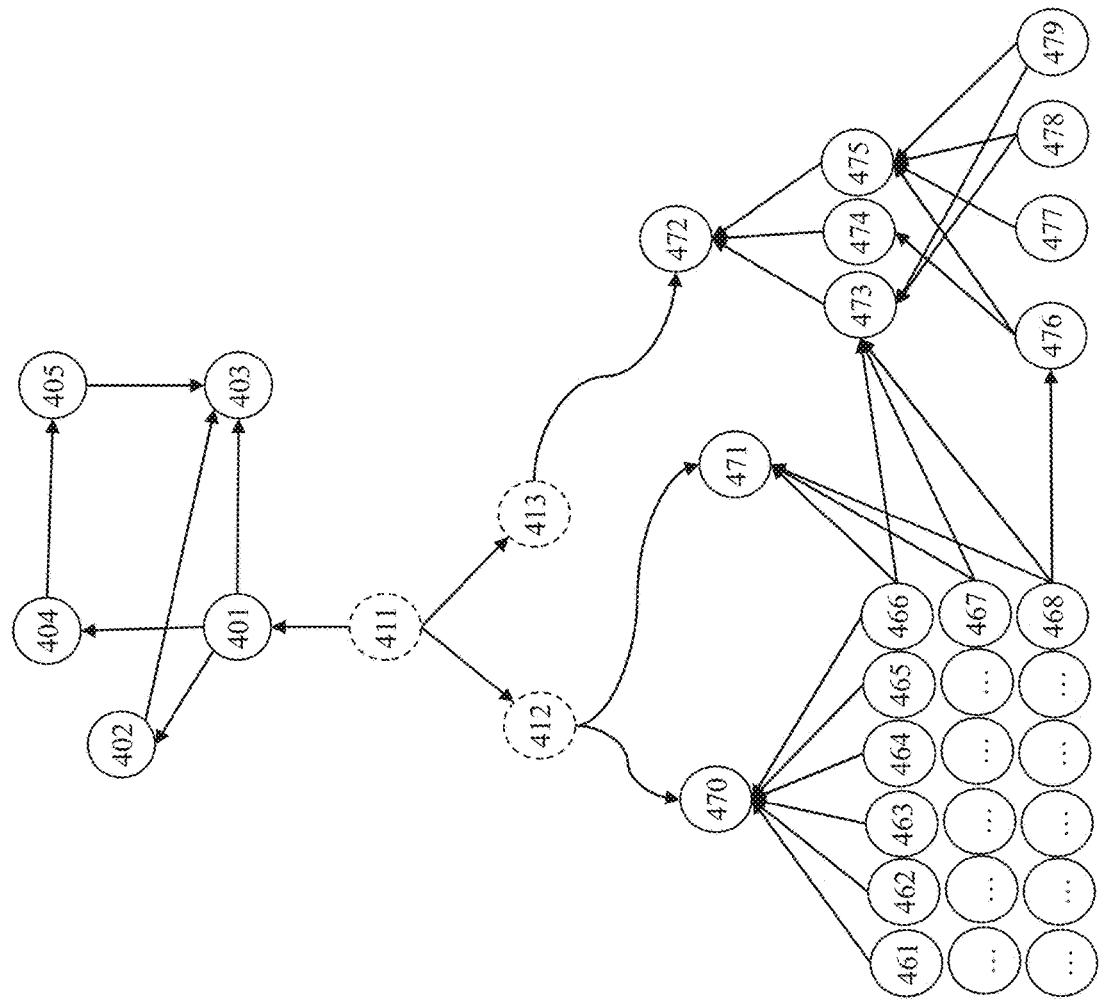
FIG. 4 illustrates an exemplary data network according to embodiments of the present disclosure.

It will be appreciated that the networks of the present disclosure are applicable to a variety of combinations of sessions, registers, data, and metadata. In this way, complex processes implemented by analytic methods may be represented in context. The networks of the present disclosure may be aggregated over time, and stored either centrally or in a distributed network. For example, the exemplary network of FIG. 4 includes a plurality of analysis nodes 401 . . . 405, a plurality of session nodes 411 . . . 413, a plurality of register nodes 470 . . . 479, and a plurality of data nodes 461 . . . 468. The linkages depicted in FIG. 4 reflect the relationships among these entities as discussed further with regard to the prior figures.

Networks according to the present disclosure may be extended directly or linked on an ad-hoc basis to ontologies or metadata that provide additional context that. In this way the usefulness of the network can be increased through better navigation, visualization, classification, user interface design, meta-analysis, security, authentication, monitoring, information sharing, or transformation.

In some embodiments, a given analysis node corresponds to a database query, for example a SQL, SPARQL, Hive, Impala, or x-Path query. In such embodiments, session nodes may refer to individual result sets, which in turn refer to data nodes corresponding to the underlying data. As in the examples provided above, such analyses may be further linked to descriptive metadata, to contextual information, and to downstream products of the query results.

In some embodiments, remote requests are received for traversal of a network. For example, a remote user may request information about all products that stemmed from a user's own data. Upon receipt of such a request, a network of the present disclosure is traversed from the data in question to the various products. It will be appreciated that various search interfaces, for example web-based interfaces, are suitable for receiving such a query from a remote user.

Referring now to FIGS. 5A-D, an exemplary data network is depicted according to embodiments of the present disclosure. In particular, an explicit representation is provided for all interrelationships between different data, metadata, and analytic algorithms in this particular case. Result 501 is linked to all related input variables and to Algorithm 502 used to calculate it. Algorithm 503 takes Result 501 and some other input to create Result 504, which in turn is used by Algorithm 505 to create a notification in the form of an email message at Result 506.

Figure 5A:
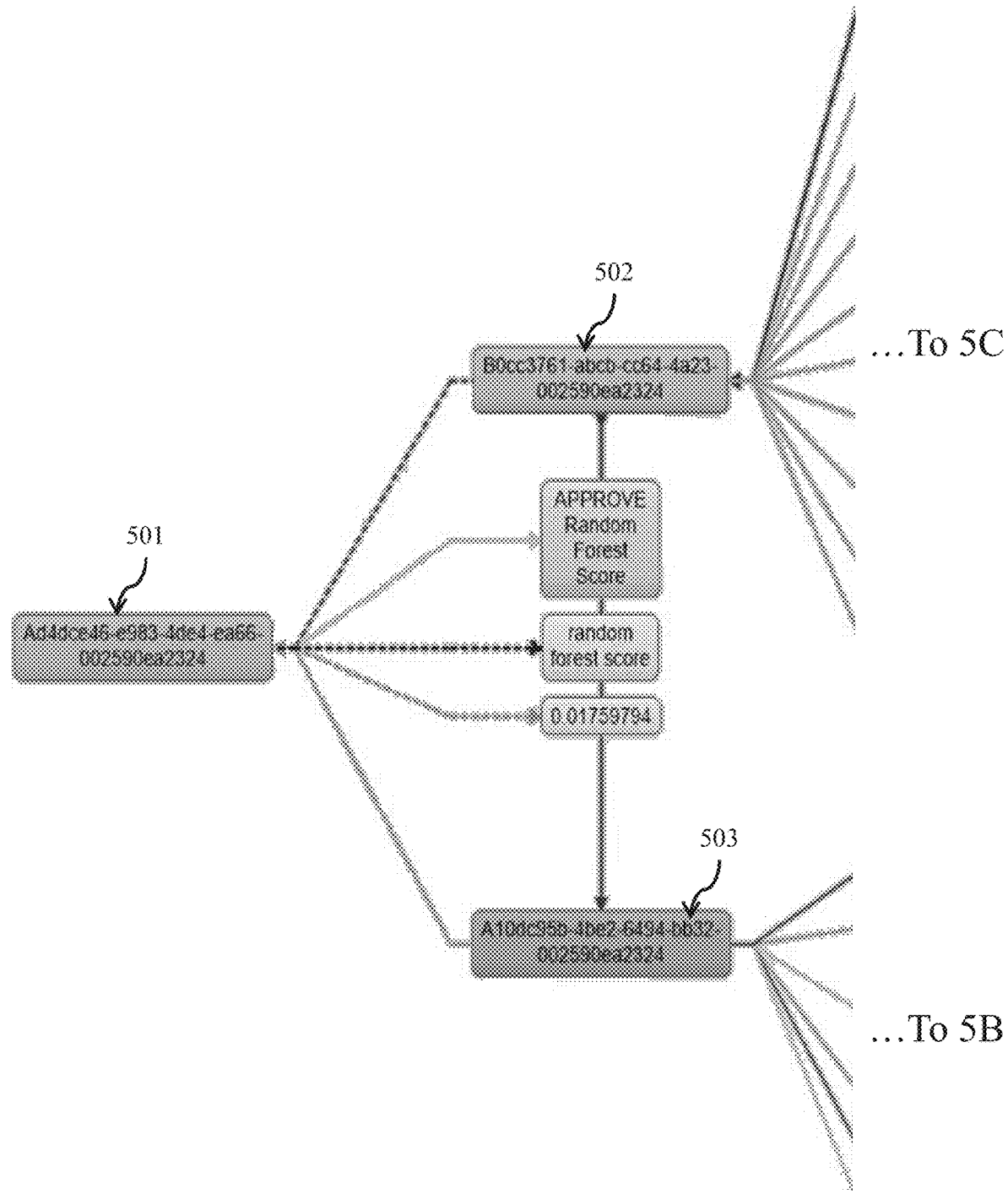
FIGS. 5A-D illustrates an exemplary data network according to embodiments of the present disclosure.
Figure 5B:
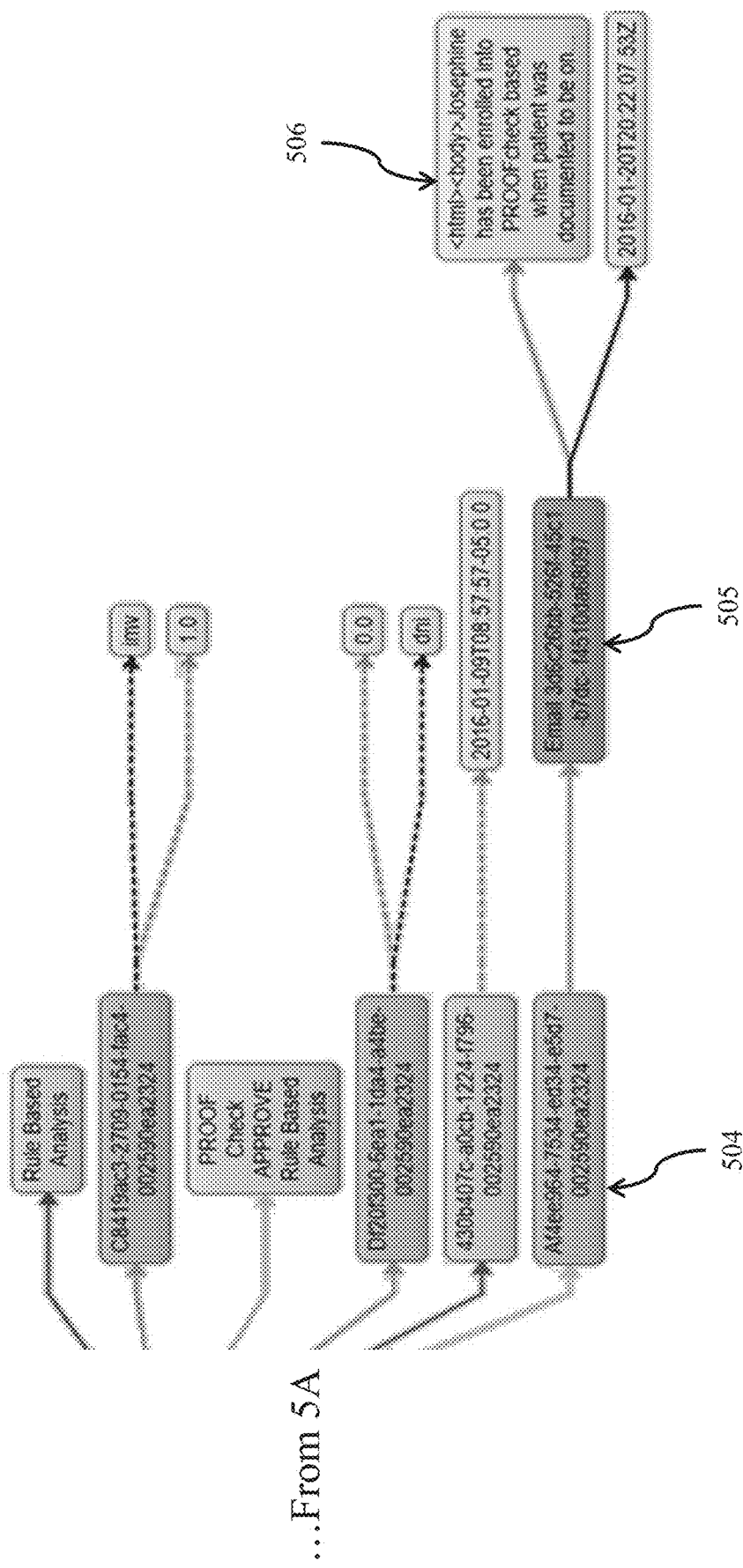
Figure 5C:
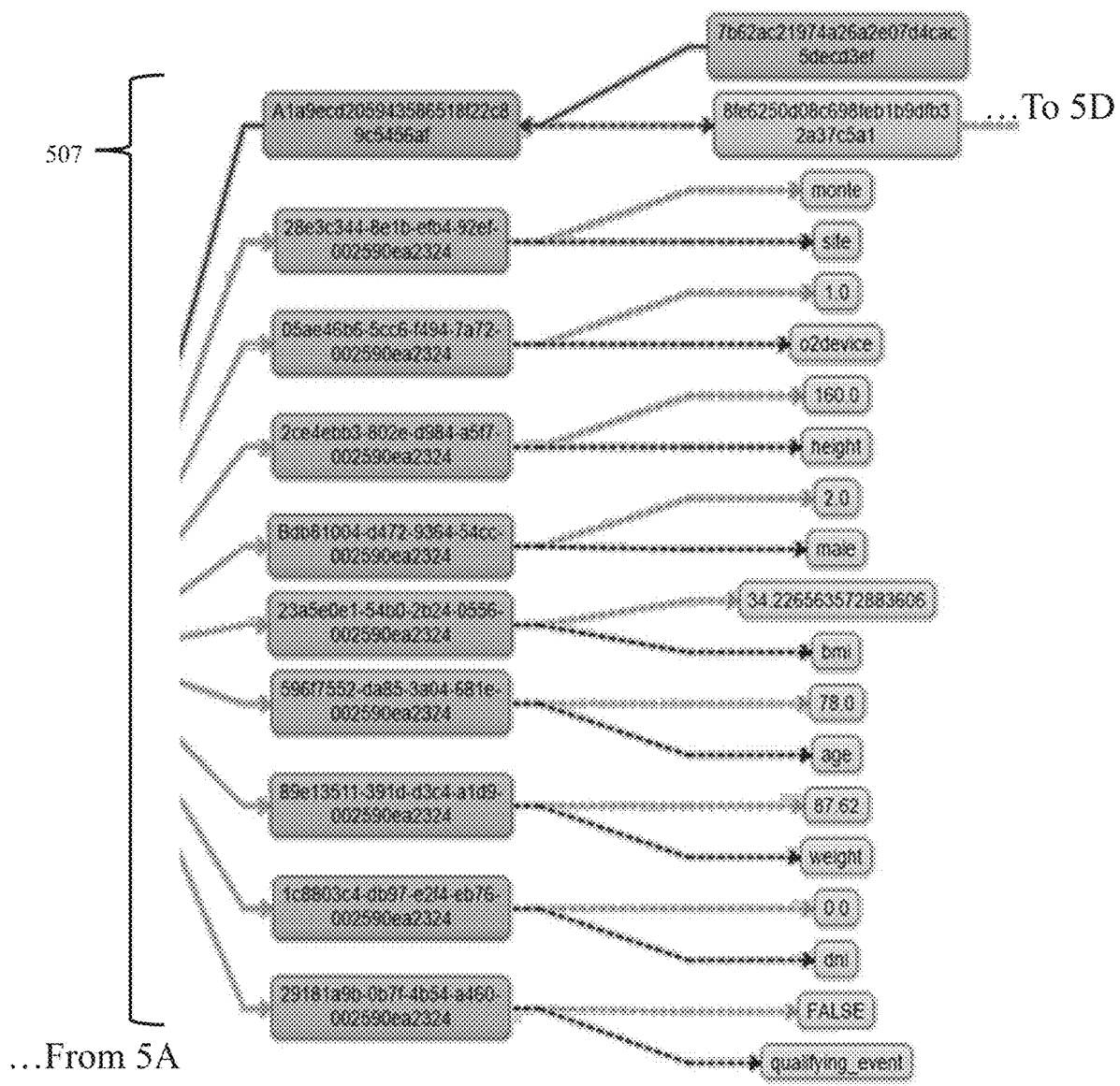
Figure 5D:
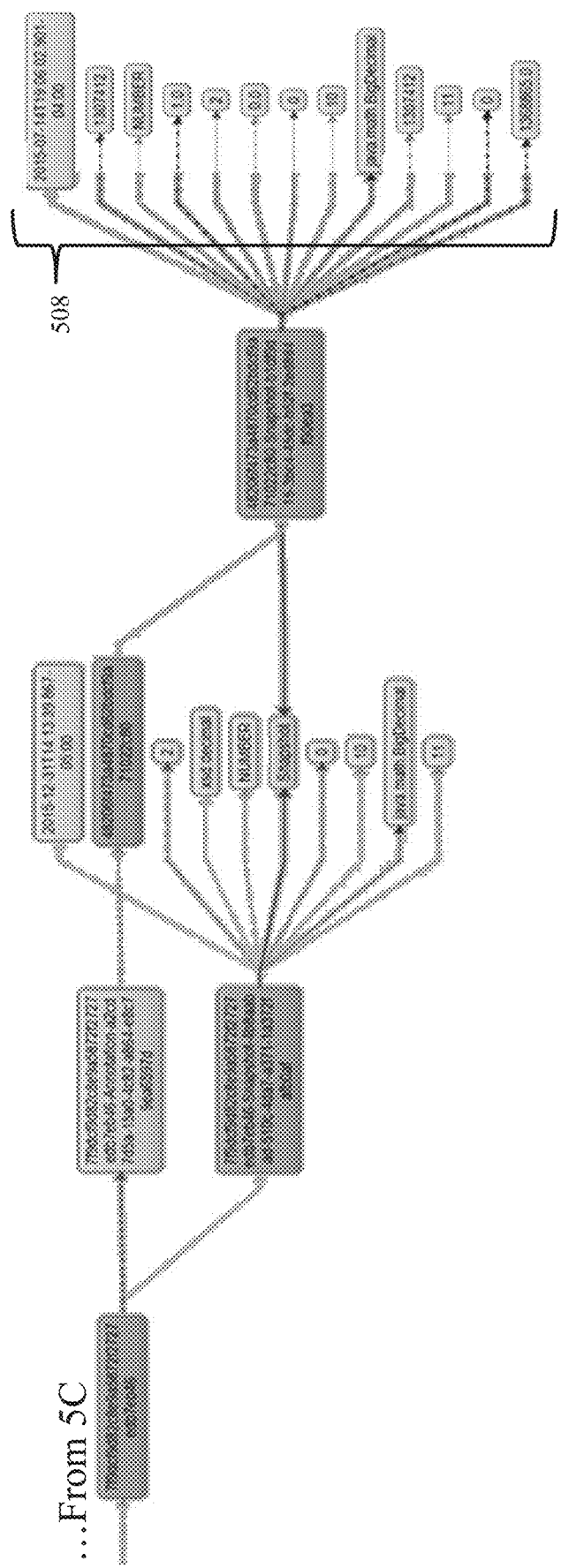
Figure 6A:
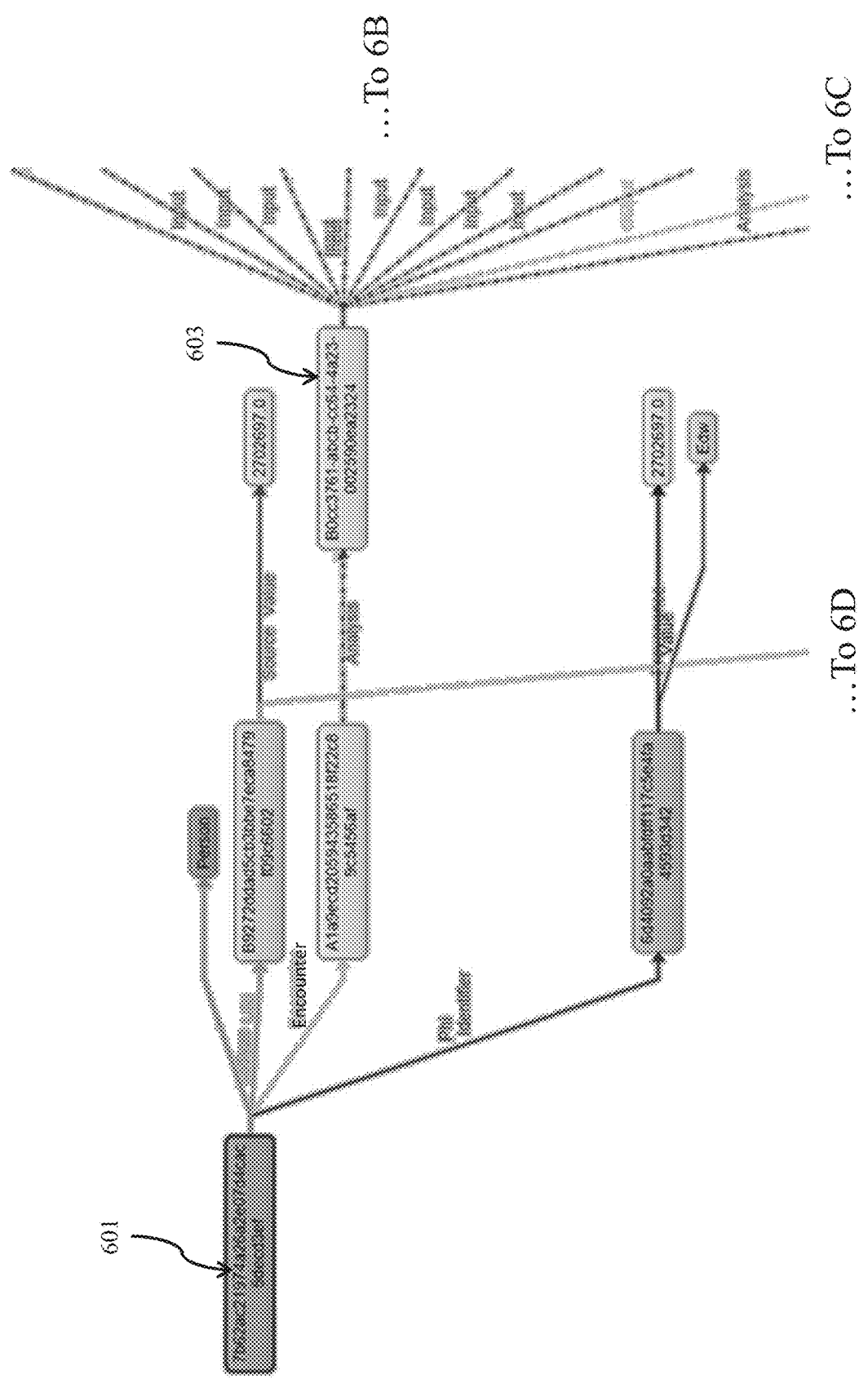
FIG. 6A-E illustrates an exemplary data network according to embodiments of the present disclosure.
Figure 6B:
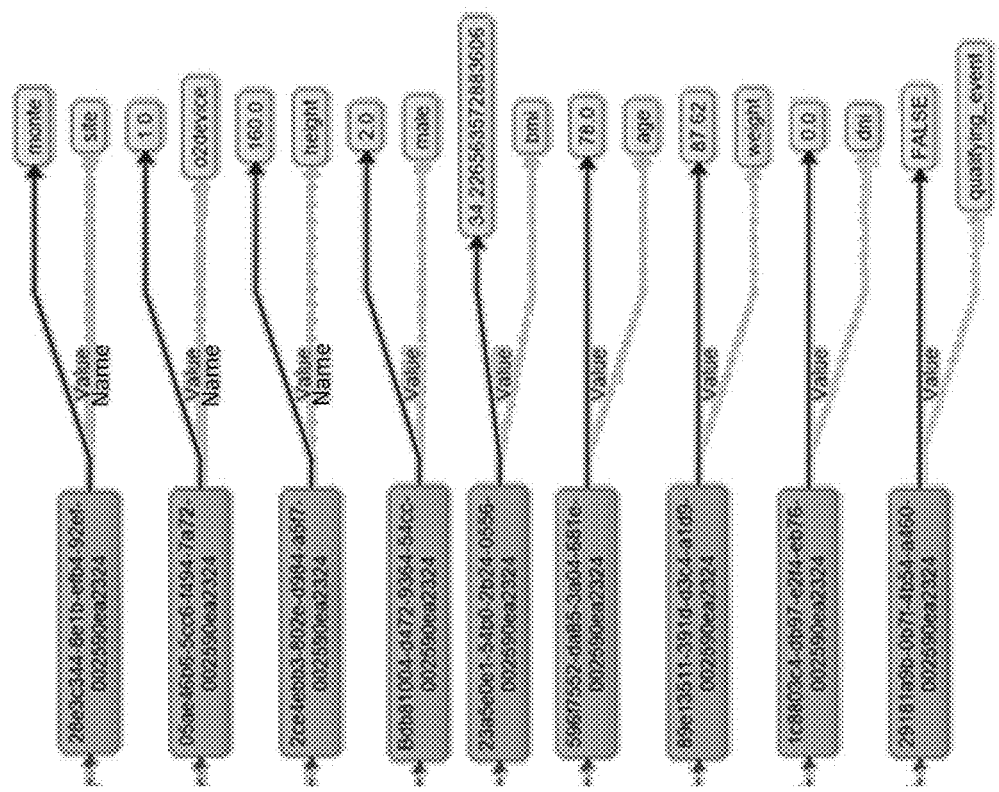
Figure 6C:
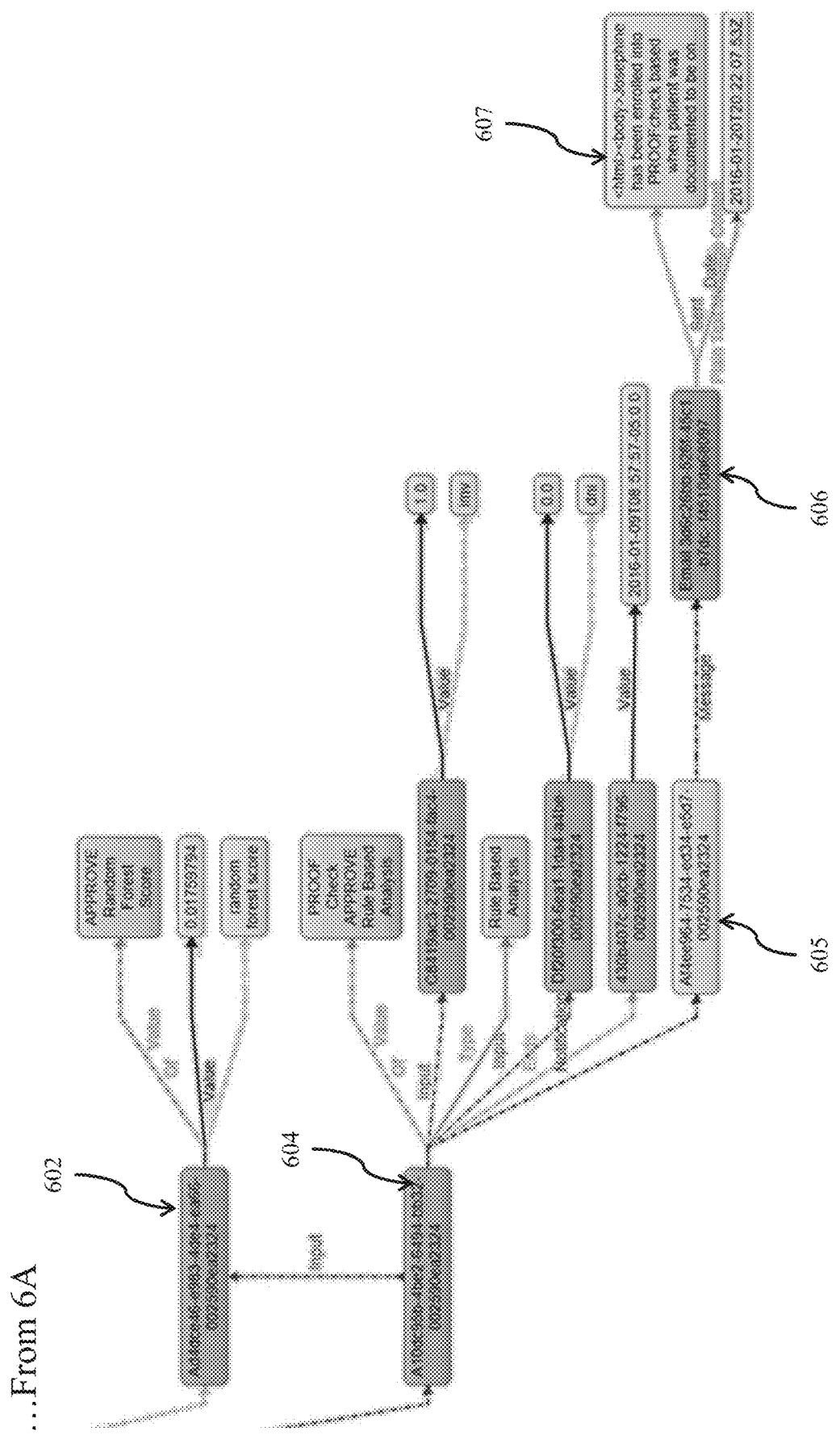
Figure 6D:
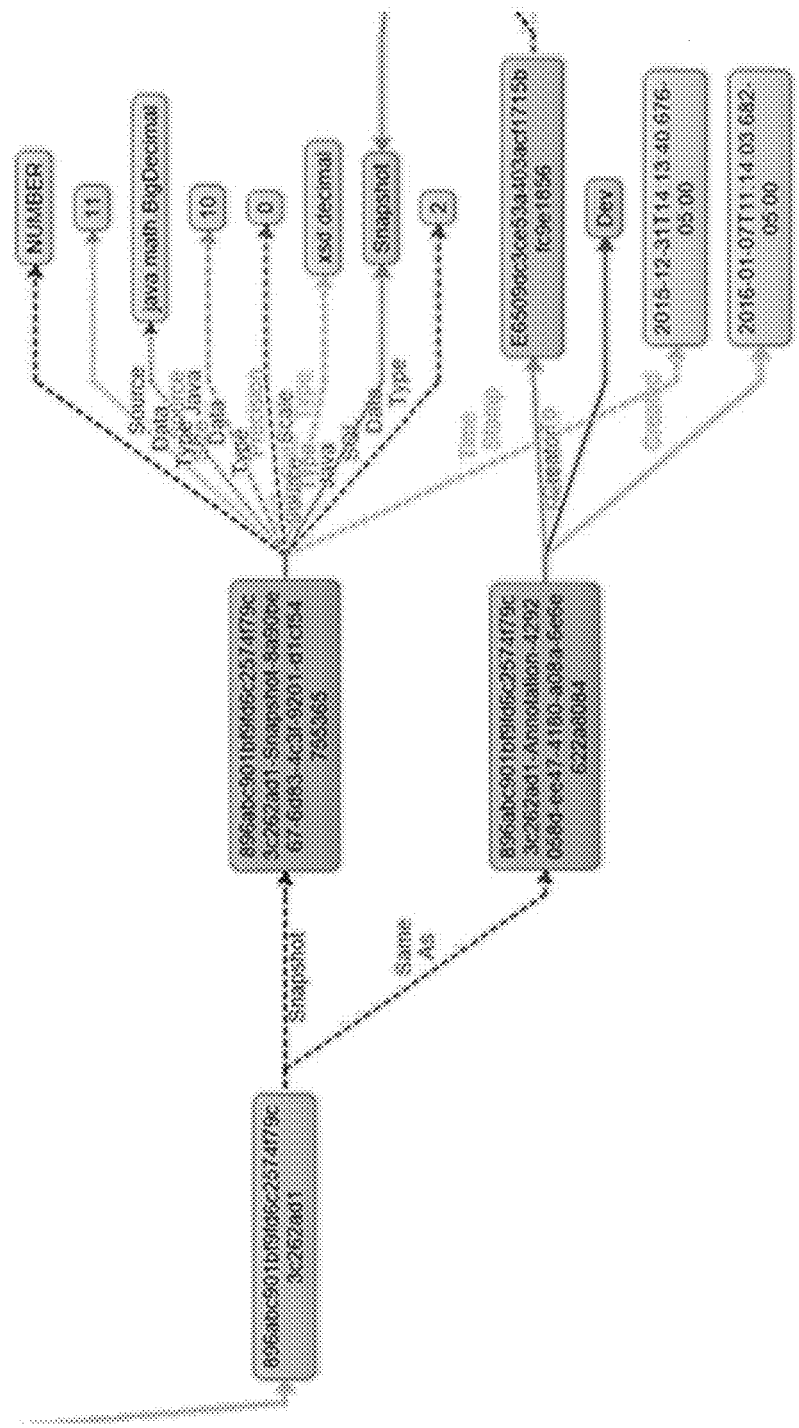
Figure 6E:
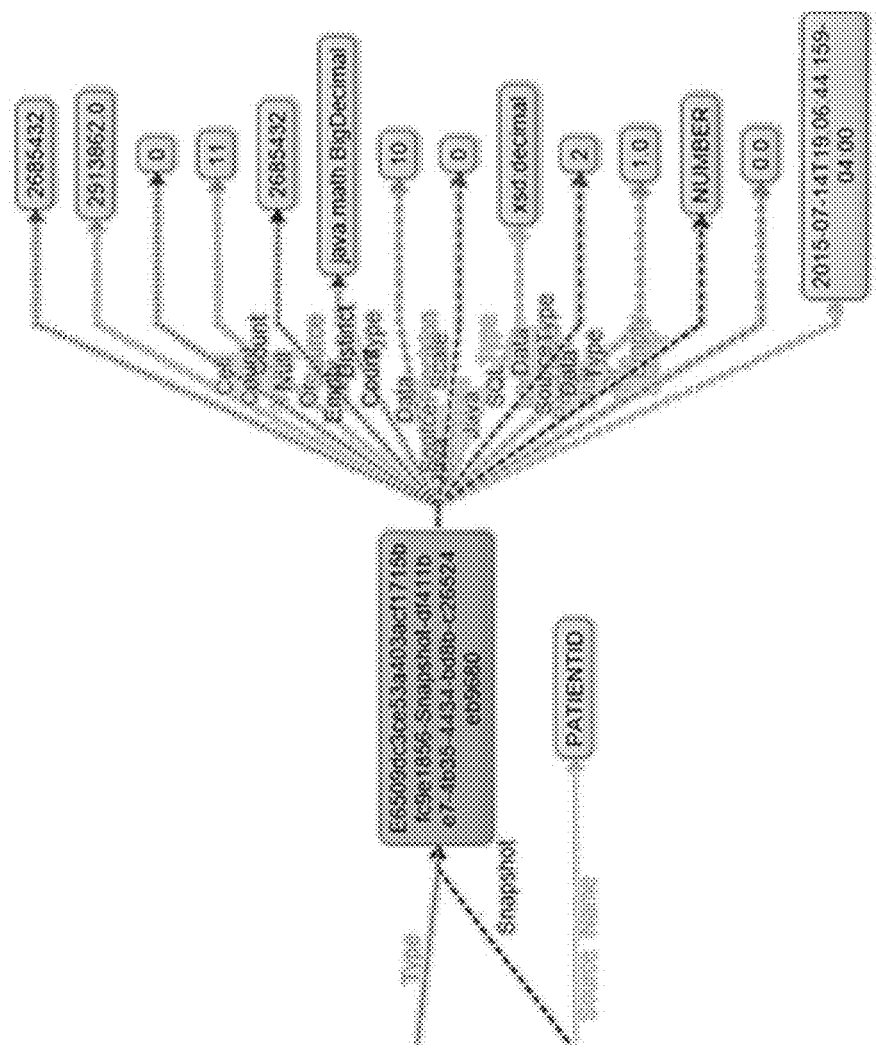

It will be appreciated that the complete graph shows for each input variable all metadata pertaining to provenance, lineage (data type and value at the source, timestamps, transformations), and a snapshot of data quality at source at the time of analysis. For example, FIG. 5C includes various inputs 507 used to compute Result 501 via Algorithm 502. FIG. 5D includes further lineage, quality, and other metadata for one of inputs 507, including quality metadata 508.

Referring now to FIGS. 6A-E, another exemplary data network is depicted according to embodiments of the present disclosure. In this case, the network is presented from the perspective of Patient 601, whose data is being used for a certain analytic. The data used to create Result 602 via Algorithm 603 and subsequent activity is illustrated from the perspective of Patient 601. Algorithm 604 and Result 605 correspond to Algorithm 503 and Result 504 in the prior example. Likewise, Algorithm 606 and Result 607 correspond to Algorithm 505 and Result 506. Lineage metadata are provided in FIG. 6D and quality metadata are provided in FIG. 6E.

Figure 7:
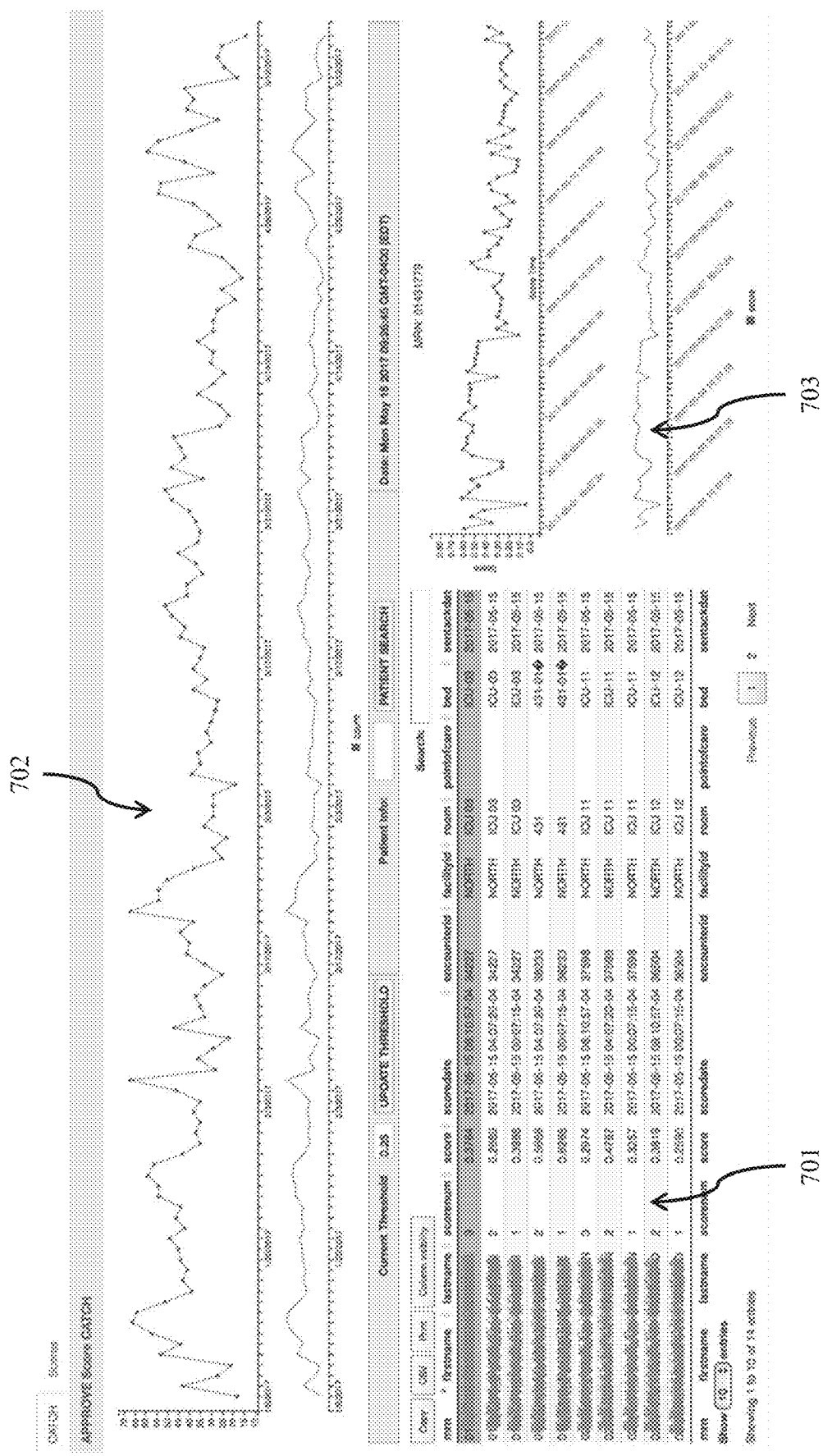
FIG. 7 illustrates an exemplary user interface according to embodiments of the present disclosure.

Referring now to FIG. 7, an exemplary user interface is illustrated according to embodiments of the present disclosure. A variety of relationships captured by systems according to the present disclosure may be visualized, for example through a web interface. In this example, a particular algorithm is selected. The visualization shows all results produced by the selected analytic process over time, and enables users to focus on specific periods for which the analytic was performed. For all results from that period, all input variables and other metadata are displayed in a table 701, including patients that the analytic has touched. Patient-centered graphs outline all algorithm results pertaining to a single selected patient for the selected period 702 and for all time 703. It will be appreciated that this is just one data display enabled by systems according to the present disclosure.

Figure 8:
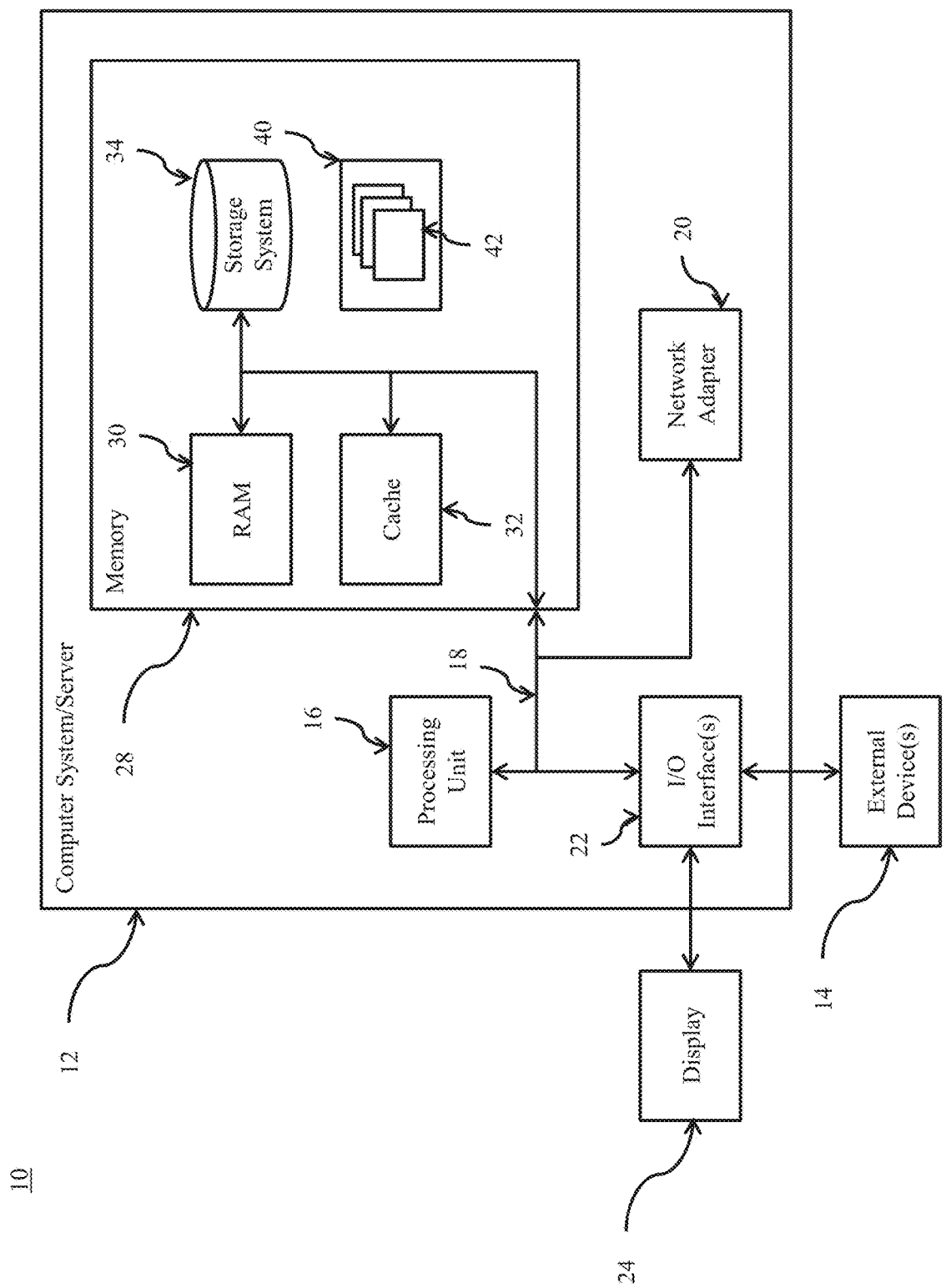
FIG. 8 depicts a computing node according to embodiments of the present disclosure.

Referring now to FIG. 8, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
generating a plurality of data nodes, the data nodes corresponding to data;
generating a first process node in a network, the first process node corresponding to a first analytic method;
generating a plurality of session nodes in the network, wherein each session node corresponds to an execution among a plurality of executions of the first analytic method upon data identified by the plurality of data nodes;
linking each of the plurality of session nodes to the first process node;
associating with the plurality of session nodes metadata regarding the plurality of executions, wherein the metadata comprises at least one of a duration, a start time, and an end time of one of the plurality of executions;
generating at least one product node corresponding to a product, the product integrating a result value of at least one of the plurality of executions;
generating a register node corresponding to the result value;
linking the register node to the session node of the plurality of session nodes corresponding to the at least one of the plurality of executions;
linking the plurality of data nodes to the register node;
linking the at least one product node to the session node of the plurality of session nodes corresponding to the at least one of the plurality of executions;
receiving a remote request from a user, the user being associated with at least one of the plurality of data nodes;
determining a set of products derived from data of the at least one of the plurality of data nodes, wherein each product in the set of products comprises a result generated by a respective session node of the plurality of session nodes; and
generating a visualization to show at least one result produced by the first analytic method over time and to show a specific period of time during which the first analytic method was performed.

2. The method of claim 1, wherein the product is a journal publication, a report, a presentation, or a patent publication.

3. The method of claim 1, wherein the network is represented as a graph.

4. The method of claim 1, further comprising:
traversing the network to determine a set of products derived from the first analytic method.

5. The method of claim 1, further comprising:
traversing the network to determine a set of products derived from the data.

6. The method of claim 1, wherein the network further comprises an authentication node linked to at least one of the plurality of data nodes, wherein the method further comprises:
validating a request for access to the at least one of the plurality of data nodes based on the authentication node.

7. The method of claim 1, wherein the at least one product node comprises a unique resource identifier (URI) referencing the corresponding product.

8. The method of claim 1, wherein the product is a datastore.

9. The method of claim 1, wherein the product is a datastore, and wherein the datastore is referenced by a data node of the plurality of data nodes.

10. A computer program product for persistence and linking of analytic products, the computer program product comprising a computer readable storage medium having program instructions embodied therewith, the program instructions executable by a processor to cause the processor to perform a method comprising:

generating a plurality of data nodes, the data nodes corresponding to data;
generating a first process node in a network, the first process node corresponding to a first analytic method;
generating a plurality of session nodes in the network, wherein each session node corresponds to an execution among a plurality of executions of the first analytic method upon data identified by the plurality of data nodes;
linking each of the plurality of session nodes to the first process node;
associating with the plurality of session nodes metadata regarding the plurality of executions, wherein the metadata comprises at least one of a duration, a start time, and an end time of one of the plurality of executions;
generating at least one product node corresponding to a product, the product integrating a result value of at least one of the plurality of executions;
generating a register node corresponding to the result value;
linking the register node to the session node of the plurality of session nodes corresponding to the at least one of the plurality of executions;
linking the plurality of data nodes to the register node;
linking the at least one product node to the session node of the plurality of session nodes corresponding to the at least one of the plurality of executions;
receiving a remote request from a user, the user being associated with at least one of the plurality of data nodes;
determining a set of products derived from data of the at least one of the plurality of data nodes wherein each product in the set of products comprises a result generated by a respective session node of the plurality of session nodes; and
generating a visualization to show at least one result produced by the first analytic method over time and to show a specific period of time during which the first analytic method was performed.

11. The computer program product of claim 10, wherein the product is a journal publication, a report, a presentation, or a patent publication.

12. The computer program product of claim 10, wherein the network is represented as a graph.

13. The computer program product of claim 10, the method further comprising:
traversing the network to determine a set of products derived from the first analytic method.

14. The computer program product of claim 10, the method further comprising:
traversing the network to determine a set of products derived from the data.

15. The computer program product of claim 10, wherein the network further comprises an authentication node linked to at least one of the plurality of data nodes, wherein the method further comprises:
validating a request for access to the at least one of the plurality of data nodes based on the authentication node.

16. The computer program product of claim 10, wherein the at least one product node comprises a unique resource identifier (URI) referencing the corresponding product.

17. The computer program product of claim 10, wherein the product is a datastore.

18. The computer program product of claim 10, wherein the product is a datastore, and wherein the datastore is referenced by a data node of the plurality of data nodes.

19. A system comprising:
a computing node comprising a computer readable storage medium having program instructions embodied therewith, the program instructions executable by a processor of the computing node to cause the processor to perform a method comprising:
generating a plurality of data nodes, the data nodes corresponding to data;
generating a first process node in a network, the first process node corresponding to a first analytic method;
generating a plurality of session nodes in the network, wherein each session node corresponds to an execution among a plurality of executions of the first analytic method upon data identified by the plurality of data nodes;
linking each of the plurality of session nodes to the first process node;
associating with the plurality of session nodes metadata regarding the plurality of executions, wherein the metadata comprises at least one of a duration, a start time, and an end time of one of the plurality of executions;
generating at least one product node corresponding to a product, the product integrating a result value of at least one of the plurality of executions;
generating a register node corresponding to the result value;
linking the register node to the session node of the plurality of session nodes corresponding to the at least one of the plurality of executions;
linking the plurality of data nodes to the register node;
linking the at least one product node to the session node of the plurality of session nodes corresponding to the at least one of the plurality of executions;
receiving a remote request from a user, the user being associated with at least one of the plurality of data nodes;
determining a set of products derived from data of the at least one of the plurality of data nodes wherein each product in the set of products comprises a result generated by a respective session node of the plurality of session nodes; and
generating a visualization to show at least one result produced by the first analytic method over time and to show a specific period of time during which the first analytic method was performed.

20. The system of claim 19, wherein the product is a journal publication, a report, a presentation, or a patent publication.

21. The system of claim 19, wherein the network is represented as a graph.

22. The system of claim 19, the method further comprising:
traversing the network to determine a set of products derived from the first analytic method.

23. The system of claim 19, the method further comprising:
traversing the network to determine a set of products derived from the data.

24. The system of claim 19, wherein the network further comprises an authentication node linked to at least one of the plurality of data nodes, wherein the method further comprises:
validating a request for access to the at least one of the plurality of data nodes based on the authentication node.

25. The system of claim 19, wherein the at least one product node comprises a unique resource identifier (URI) referencing the corresponding product.

26. The system of claim 19, wherein the product is a datastore.

27. The system of claim 19, wherein the product is a datastore, and wherein the datastore is referenced by a data node of the plurality of data nodes.

* * * * *